United States Patent
Bandyopadhyay et al.

(10) Patent No.: US 10,445,070 B2
(45) Date of Patent: Oct. 15, 2019

(54) ASCII BASED INSTANT PROTOTYPE GENERATION

(71) Applicant: International Business Machines Corporation, Armonk, NY (US)

(72) Inventors: Santanu Bandyopadhyay, West Benghal (IN); Ramesh C. Pathak, Bangalore (IN); Suryanarayana K. Rao, Bangalore (IN); Sautam Sengupta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/147,355

(22) Filed: May 5, 2016

(65) Prior Publication Data

US 2017/0322779 A1  Nov. 9, 2017

(51) Int. Cl.
  *G06F 8/30* (2018.01)
  *G06F 17/27* (2006.01)

(52) U.S. Cl.
  CPC ............ *G06F 8/30* (2013.01); *G06F 17/2735* (2013.01); *G06F 17/2765* (2013.01)

(58) Field of Classification Search
  CPC ....................................................... G06F 8/30
  USPC ....................................................... 717/106
  See application file for complete search history.

(56) References Cited

U.S. PATENT DOCUMENTS

| | | | |
|---|---|---|---|
| 5,218,458 A | 6/1993 | Kochis et al. | |
| 5,996,012 A | 11/1999 | Jarriel | |
| 7,197,739 B2 | 3/2007 | Preston et al. | |
| 7,398,196 B1 * | 7/2008 | Liu | G06F 17/2745 704/1 |
| 7,886,222 B2 | 2/2011 | Bagare et al. | |
| 7,941,784 B2 | 5/2011 | Shenfield et al. | |
| 7,984,442 B2 | 7/2011 | Klingman | |
| 8,407,666 B2 | 3/2013 | Shenfield et al. | |
| 8,843,883 B2 | 9/2014 | Chowdhary et al. | |
| 2008/0288965 A1 * | 11/2008 | Grechanik | G06F 8/36 719/328 |
| 2010/0185701 A1 * | 7/2010 | Ramamurthi | G06F 17/30306 707/803 |
| 2010/0287530 A1 * | 11/2010 | MacLean | G06F 8/10 717/105 |

(Continued)

FOREIGN PATENT DOCUMENTS

CN    1987877 A    6/2007

*Primary Examiner* — Chat C Do
*Assistant Examiner* — Bradford F Wheaton
(74) *Attorney, Agent, or Firm* — Gilbert Harmon, Jr.

(57) ABSTRACT

An approach to generating an application prototype. The approach parses ASCII text-based requirements into a collection of sentences and parses the collection of sentences into collections words associated with the collection of sentences. The approach then uses an ASCII dictionary to determine the nouns and verbs found in the collections of words marking the nouns as entities and the verbs as responsibilities. Further, the approach determines if nouns are shared among the collection of sentences and if they are, then records relationships between the sentences. The approach then generates metadata describing these components and generates byte code based on the metadata. The approach packages the byte code, other data relating to the entry point and type of prototype application, e.g., web-based or standalone and an encryption module for distribution.

20 Claims, 6 Drawing Sheets

(56) References Cited

U.S. PATENT DOCUMENTS

| | | | | |
|---|---|---|---|---|
| 2011/0246181 A1* | 10/2011 | Liang | ............... | G06F 17/2775 |
| | | | | 704/9 |
| 2012/0278883 A1* | 11/2012 | Gayman | ............... | G06F 21/51 |
| | | | | 726/19 |
| 2016/0062739 A1* | 3/2016 | Kaulgud | ............... | G06F 8/20 |
| | | | | 717/107 |

* cited by examiner

ASCII BASED INSTANT PROTOTYPE GENERATION

BACKGROUND OF THE INVENTION

The present invention relates generally to the generation application prototypes and more specifically, to the generation of application prototypes from the text of a requirements document.

Developers prepare application prototypes to provide a preliminary view of the result of a planned development effort and to convince the sponsors of the development that the development team has an understanding of the requirements document associated with the application development candidate. Current methods for preparing an application prototype generally require either specific knowledge of a prototype development system or significant time developing a prototype in the implementation language to produce a shell of the desired application.

SUMMARY

According to an embodiment of the present invention, a method for creating an application prototype from text-based requirements, the method comprising: creating, by a prototype generation component, a collection of one or more sentences based on parsing a collection of text-based requirements; creating, by the prototype generation component, one or more collections of words based on parsing the one or more sentences, respectively; identifying, by the prototype generation component, nouns and verbs in the one or more collections of words, wherein the nouns are entities and the verbs are responsibilities associated with the entities; determining, by the prototype generation component, if identified entities in one of the one or more collections of words is present in one or more of the remainder of the one or more collections of words; responsive to the determining, by the prototype generation component, the identified entities are present in one or more of the remainder of the one or more collections of words, creating one or more collaborations between the entities and the plurality of the one or more collections of words comprising the entities, respectively; creating, by the prototype generation component, metadata comprising the entities, the responsibilities and the collaborations for their associated one or more collections of words; and creating, by the prototype generation component, an application prototype based on the metadata and a type for the prototype.

According to another embodiment of the present invention, a computer program product for creating an application prototype from text-based requirements, the computer program product comprising: one or more non-transitory computer readable storage media and program instructions stored on the one or more non-transitory computer readable storage media, the program instructions comprising: program instructions to create, by a prototype generation component, a collection of one or more sentences based on parsing a collection of text-based requirements; program instructions to create, by the prototype generation component, one or more collections of words based on parsing the one or more sentences, respectively; program instructions to identify, by the prototype generation component, nouns and verbs in the one or more collections of words, wherein the nouns are entities and the verbs are responsibilities associated with the entities; program instructions to determine, by the prototype generation component, if identified entities in one of the one or more collections of words is present in one or more of the remainder of the one or more collections of words; responsive to the program instructions to determine, by the prototype generation component, the identified entities are present in one or more of the remainder of the one or more collections of words, program instructions to create one or more collaborations between the entities and the plurality of the one or more collections of words comprising the entities, respectively; program instructions to create, by the prototype generation component, metadata comprising the entities, the responsibilities and the collaborations for their associated one or more collections of words; and program instructions to create, by the prototype generation component, an application prototype based on the metadata and a type for the prototype.

According to another embodiment of the present invention, a computer system for creating an application prototype from text-based requirements, the computer system comprising: one or more computer processors; one or more non-transitory computer readable storage media; program instructions stored on the one or more non-transitory computer readable storage media for execution by at least one of the one or more computer processors, the program instructions comprising: program instructions to create, by a prototype generation component, a collection of one or more sentences based on parsing a collection of text-based requirements; program instructions to create, by the prototype generation component, one or more collections of words based on parsing the one or more sentences, respectively; program instructions to identify, by the prototype generation component, nouns and verbs in the one or more collections of words, wherein the nouns are entities and the verbs are responsibilities associated with the entities; program instructions to determine, by the prototype generation component, if identified entities in one of the one or more collections of words is present in one or more of the remainder of the one or more collections of words; responsive to the program instructions to determine, by the prototype generation component, the identified entities are present in one or more of the remainder of the one or more collections of words, program instructions to create one or more collaborations between the entities and the plurality of the one or more collections of words comprising the entities, respectively; program instructions to create, by the prototype generation component, metadata comprising the entities, the responsibilities and the collaborations for their associated one or more collections of words; and program instructions to create, by the prototype generation component, an application prototype based on the metadata and a type for the prototype.

DETAILED DESCRIPTION

The embodiments depicted and described herein recognize the benefits of generating web-based and/or standalone application prototypes directly from requirements provided by a requirements gathering team. Further, generating an application prototype is not dependent on a particular technical team with particular competencies associated with proprietary prototyping tools. Considering the embodiments, the requirements, in an ASCII format, are analyzed against a logical ASCII dictionary and the application prototype is generated based on the parsed requirements.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
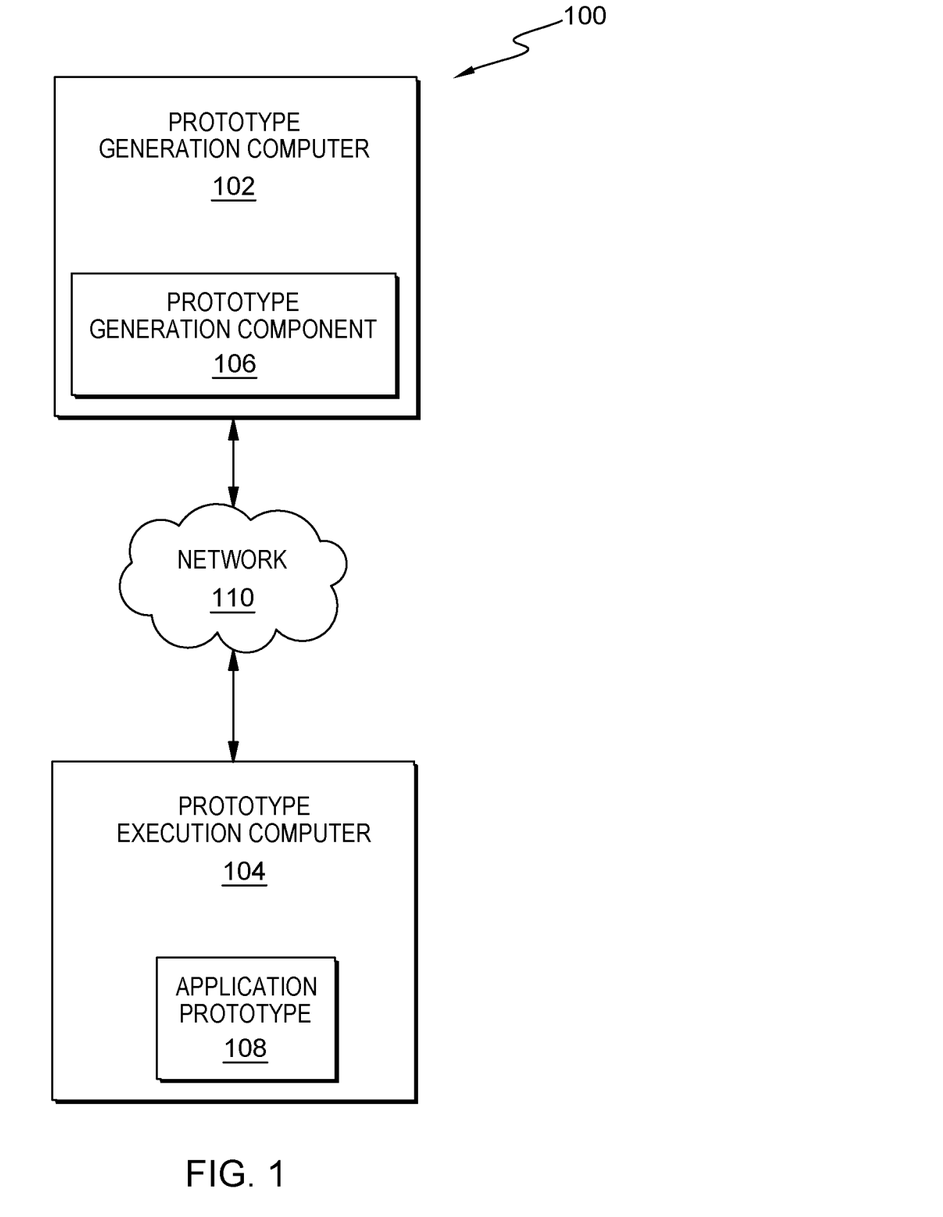
FIG. 1 is a functional block diagram generally depicting a application prototype generation environment, in accordance with an embodiment of the present invention.

FIG. 1 is a functional block diagram illustrating, generally, an embodiment of an ASCII based prototype generation environment 100. The ASCII based prototype generation environment 100 comprises a prototype generation component 106 operating on a prototype generation computer 102, one or more application prototypes 108 operating on one or more prototype execution computers 104 and a network 110 supporting communications between the prototype generation computer 102 and the one or more prototype execution computers 104.

Prototype generation computer 102 can be a standalone computing device, management server, a web server, a mobile computing device, or any other electronic device or computing system capable of receiving, sending, and processing data. In other embodiments, prototype generation computer 102 can represent a server computing system utilizing multiple computers as a server system. In another embodiment, prototype generation computer 102 can be a laptop computer, a tablet computer, a netbook computer, a personal computer, a desktop computer or any programmable electronic device capable of communicating with other computing devices (not shown) within prototype generation environment 100 via network 110.

In another embodiment, prototype generation computer 102 represents a computing system utilizing clustered computers and components (e.g., database server computers, application server computers, etc.) that act as a single pool of seamless resources when accessed within prototype generation environment 100. Prototype generation computer 102 can include internal and external hardware components, as depicted and described in further detail with respect to FIG. 5. Prototype generation component 106 can be a framework for generating application prototypes based on parsing simple text, in any language, associated with a written description of the requirements provided for the application. The parsing results in identifying nouns and verbs of the requirements wherein the nouns and verbs are transformed into entities and responsibilities/collaborations respectively and byte code corresponding to the entities and responsibilities/collaborations is generated.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between prototype generation computer 102 and prototype execution computer 104.

Prototype execution computer 104 can be a standalone computing device, management server, a web server, a mobile computing device, or any other electronic device or computing system capable of receiving, sending, and processing data. In other embodiments, prototype execution computer 104 can represent a server computing system utilizing multiple computers as a server system. In another embodiment, prototype execution computer 104 can be a laptop computer, a tablet computer, a netbook computer, a personal computer, a desktop computer, or any programmable electronic device capable of communicating with other computing devices (not shown) within prototype generation environment 100 via network 110.

In another embodiment, prototype execution computer 104 represents a computing system utilizing clustered computers and components (e.g., database server computers, application server computers, etc.) that act as a single pool of seamless resources when accessed within prototype generation environment 100. Prototype execution computer 104 can include internal and external hardware components, as depicted and described in further detail with respect to FIG. 5. Application prototype 108 can be, but without limitation, a web-based or standalone prototype, executable and reflecting the requirements provided by the requirements gathering team.

Figure 2:
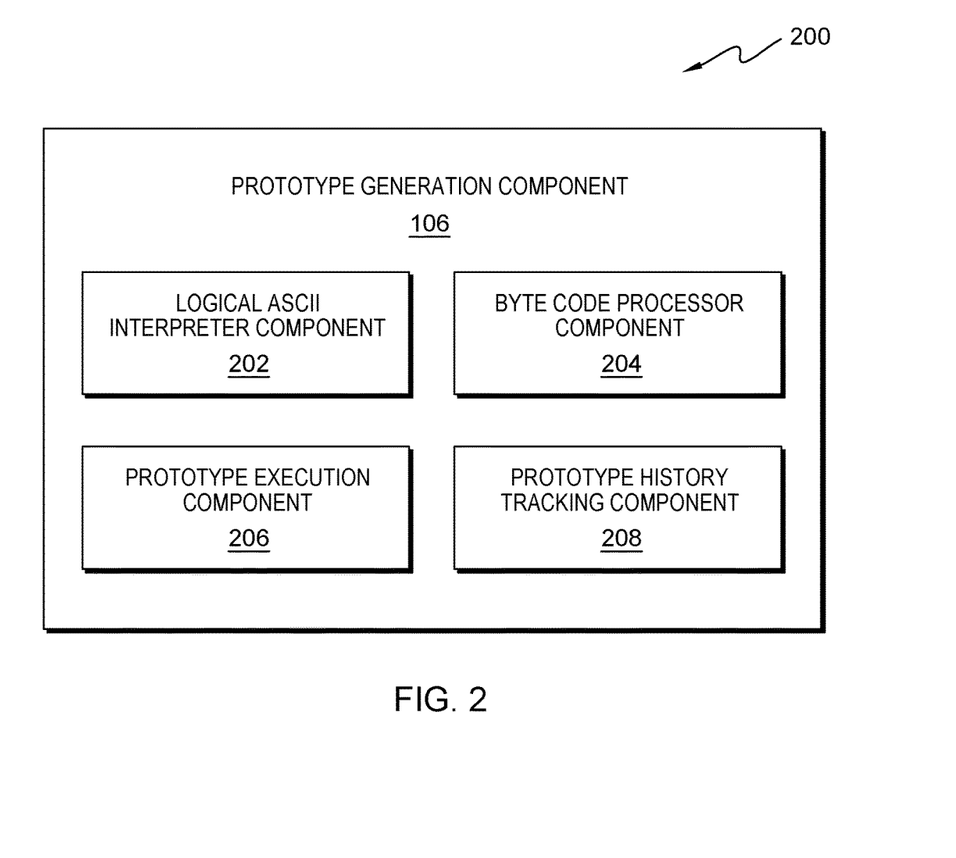
FIG. 2 is a functional block diagram depicting a prototype generation component, in accordance with an embodiment of the present invention.

FIG. 2 is a functional block diagram 200 depicting prototype generation component 106 comprising logical ASCII interpreter component 202, byte code processor component 204, prototype execution component 206 and prototype history tracking component 208.

Logical ASCII interpreter component 202 of an embodiment of the present invention provides the capability to read an input file of requirements generated by a requirement gathering team. The logical ASCII interpreter component 202 can divide the file into one or more sentences and identify the nouns and verbs, i.e., entities, associated with the one or more sentences, respectively. The logical ASCII interpreter component 202 further provides the capability, based on identified nouns or a verbs, to determine associated responsibilities and collaborations with other entities for any of the requirement sentences.

Byte code processor component 204 of an embodiment of the present invention provides the capability to convert the identified nouns (entities), verbs (responsibilities) and collaborations to corresponding byte code forming a deployable module suitable for client demonstration. The embodiment deployable module can be a standalone or a browser based module. It should be noted that the Byte Code Processor Component 204 can be run multiple times and the output can be either standalone or browser based for any specific run.

Prototype Execution Component 206 provides the capability to execute the prototype, either web-based or standalone, on a prototype execution computer 104. In one embodiment, the web-based Prototype Execution Component 206 can be any browser supported on the desired platform. In another embodiment, the standalone Prototype Execution Component 206 can be an application, executable on the desired platform, comprising the prototype.

Prototype History Tracking Component 208 provides the capability to baseline the requirements along with the prototype. For example, allowing updates to a feature, generating a prototype to verify the operation of the feature update and then, after verification, baseline the package, i.e., the requirements document and the prototype. In this manner, the Prototype History Tracking Component records a tracking history of changes to the requirements and the prototype. It should be noted that this model of prototype generation can be an iterative model.

For example, a user can navigate through the prototype and if the user decides the prototype requires changes then the user simply updates the ASCII text-based requirements document and provides the new requirements document to the development team, the development team generates a new prototype from the updated requirements document and provides the updated prototype to the user for further review. This review prototype/change requirements document cycle continues until the user decides the prototype, and accordingly the requirements document, completely covers the development project scope.

Figure 3:
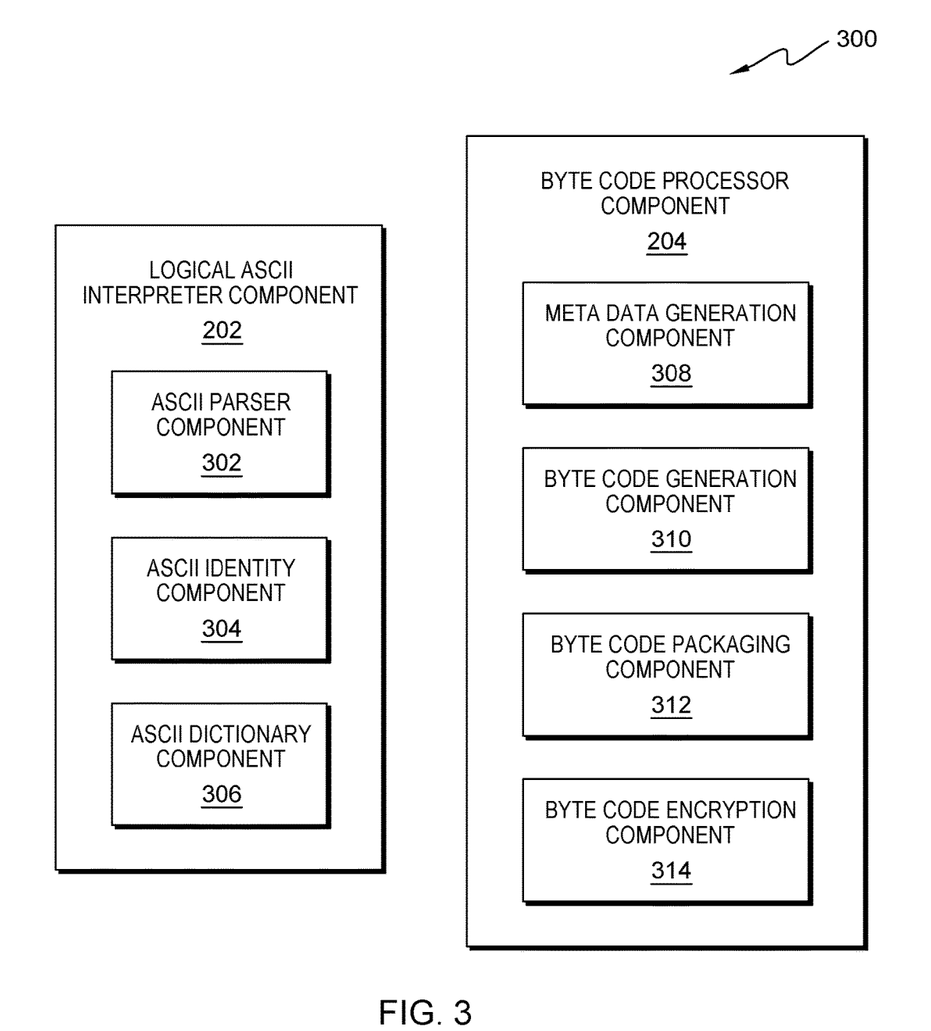
FIG. 3 is a functional block diagram depicting a logical ASCII interpreter component and a byte code processor component, in accordance with an embodiment of the present invention.

Looking to FIG. 3, depicted is a functional block diagram of the components of a Logical ASCII Interpreter Component 202 and a Byte Code Processor Component 204. The Logical ASCII Interpreter Component 202 comprises an ASCII Parser Component 302, an ASCII Identity Component 304 and an ASCII Dictionary Component 306. The Byte Code Processor Component 204 comprises a Metadata Generation Component 308, a Byte Code Generation Component 310, a Byte Code Packaging Component 312 and a Byte Code Encryption Component 314.

ASCII Parser Component 302 parses a flat file in simple ASCII text. It should be noted that the ASCII text can be in any language and written directly as prepared by the requirements gathering team. The ASCII Parser Component 302 parses the document into individual sentences based on the punctuation separating the ASCII characters, i.e., sentence delimiters. For example, the ASCII Parser Component 302 collects the ASCII characters from the beginning of the requirements document until the first period and saves the characters as the first sentence, then collects the characters between the first period and the second period between and saves the characters as the second sentence. This cycle continues until reaching the end of the requirements document. It should be noted that any number of characters can be defined as sentence separating characters allowing the user generating the requirements document to define the sentence delimiting characters.

Further in the embodiment, the ASCII Parser Component 302 parses each of the previously saved sentences into words based on white space characters as delimiters between words. As described above, it should be noted that a user can configure which characters are identified as white space characters and it is possible for a character to be both a word delimiter and a sentence delimiter. In sum, the ASCII Parser Component 302 creates a collection of sentences representing the requirements document and for each sentence in the collection, creating a collection of words representing the sentence.

ASCII Identity Component 304 provides the capability to retrieve the collection of sentences saved by the ASCII Parser Component 302 and then operate on the collection of words associated with the sentences on a sentence basis. The ASCII Identity Component 304 compares the words of a sentence to the ASCII Dictionary Component 306 to identify any words of the sentence that are nouns or verbs and subject to further processing.

Further, if the ASCII Identity Component 304 determines a word is a noun then the ASCII Identity Component 304 compares the noun to the nouns associated with other sentences of the requirements document to determine if the noun appears in other sentences. If the noun does not appear in other sentences then the noun is identified as an entity. If the noun appears in other sentences then the noun is identified as an entity and as a collaboration of the entity in the other one or more sentences.

Continuing, if the ASCII Identity Component 304 determines a word is a verb then the ASCII Identity Component 304 identifies the verb as a responsibility of the associated noun, i.e., associated entity. Accordingly, the ASCII Identity Component 304 identifies and outputs all of the entities with respect to all of the sentences associated with the one or more requirements documents wherein the entities appear, the responsibilities associated with the entities and the entities collaboration with similar entities in other sentences of the one or more requirements documents. It should be noted that similar entities relates to grammatical differences such as singular versus plural and the like. The ASCII Identity Component 304 then outputs the aforementioned results to the Byte Code Processor Component 204 for bytecode generation, described subsequently.

The ASCII Dictionary Component 306 provides the capability to identify a noun or a verb based on the presence of the noun/verb in the ASCII Dictionary Component 306, e.g. matching the noun and/or verb in the sentence with a noun and/or verb, respectively in the ASCII Dictionary Component 306. The ASCII Dictionary Component 306 varies based on industry, e.g., Health sector, Industrial sector, Retail sector, etc. Further, the ASCII Dictionary Component 306 can be prepared in any language allowing preparation of a prototype application based on a requirement document prepared in any language. The ASCII Dictionary Component 306 further comprises relationship associations of nouns and verbs. Accordingly, the ASCII Identity Component 304 will add any new relationships discovered by the ASCII Identity Component 304 and not present in the ASCII Dictionary Component 306 to the ASCII Dictionary Component 306.

Metadata Generation Component 308 provides the capability to process the output from Logical ASCII Interpreter Component 202. Metadata Generation Component 308 assimilates the entities, the entities collaborations and the responsibilities associated with the entities. Metadata Generation Component 308 also incorporates the type of prototype, i.e., web-based or standalone, into the metadata.

Byte Code Generation Component 310 provides the capability to process the metadata and generate the executable byte code components necessary for the application prototype. For example, Byte Code Generation Component 310 can create browser-based extensible markup language (XML) for the application prototype. It should be noted that Byte Code Generation Component 310 generates byte code based on the entities, their collaborations and their responsibilities.

Byte Code Packaging Component 312 combines the byte code, generated by Byte Code Generation Component 310, comprising entities, collaborations and responsibilities into a distributable package. The package further comprises an indicator for the entry point of the package where execution of the application prototype begins.

Byte Code Encryption Component 314 provides the entry point to the application prototype. Byte Code Encryption Component 314 converts the byte code to an encrypted representation and creates the links between the encrypted components of the distributable package. Accordingly, a permitted user can provide the validation to execute the application prototype. Upon exiting the application prototype, Byte Code Encryption Component 314 will delete the encrypted representation. It should be noted in the embodiment that the distributable package, including Byte Code Encryption Component are preserved for future executions of the application prototype.

Figure 4A:
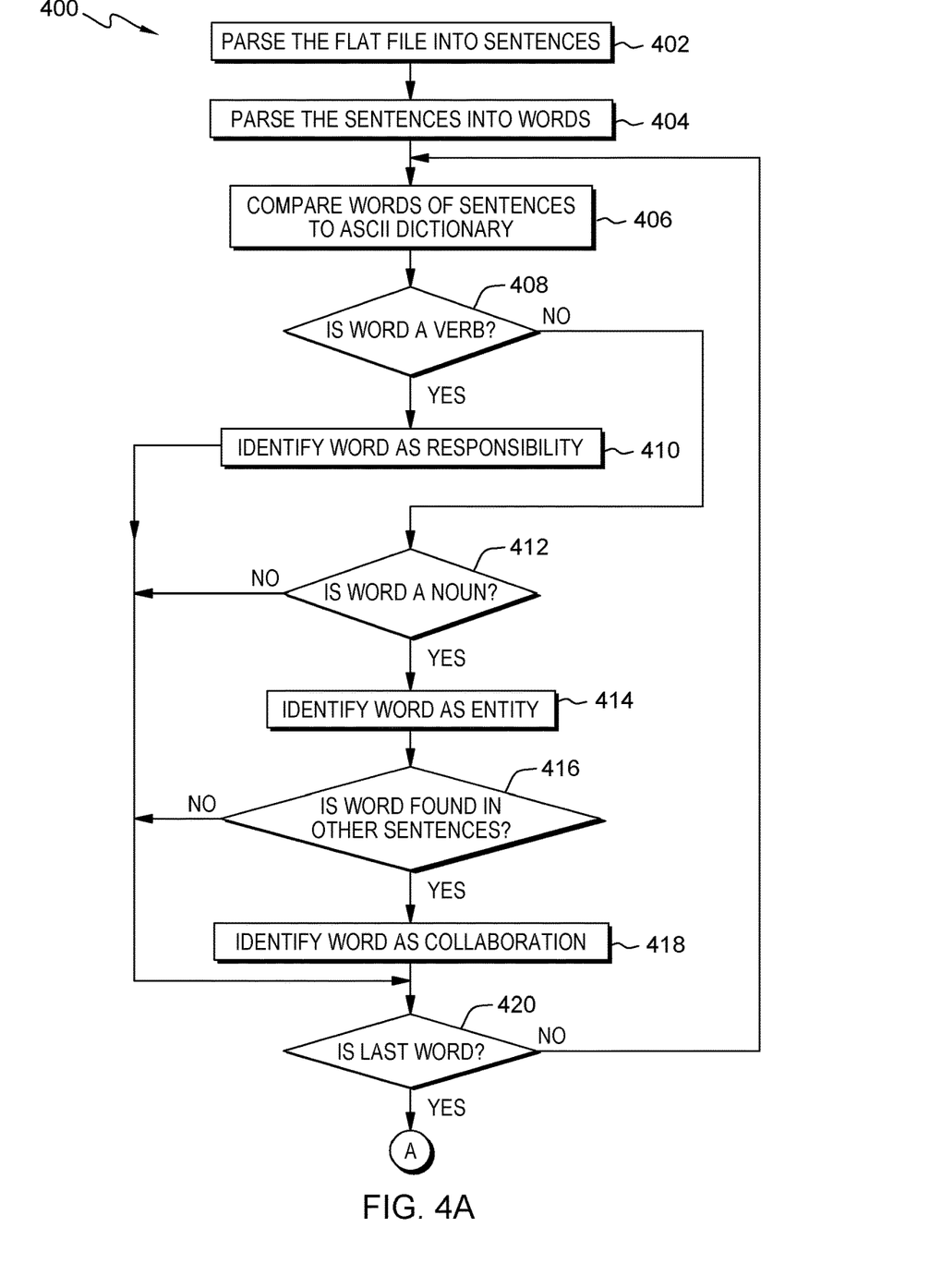
FIG. 4A, B is a flowchart depicting operational steps of a method for the generation of an application prototype, within a prototype generation environment, in accordance with an embodiment of the present invention.
Figure 4B:
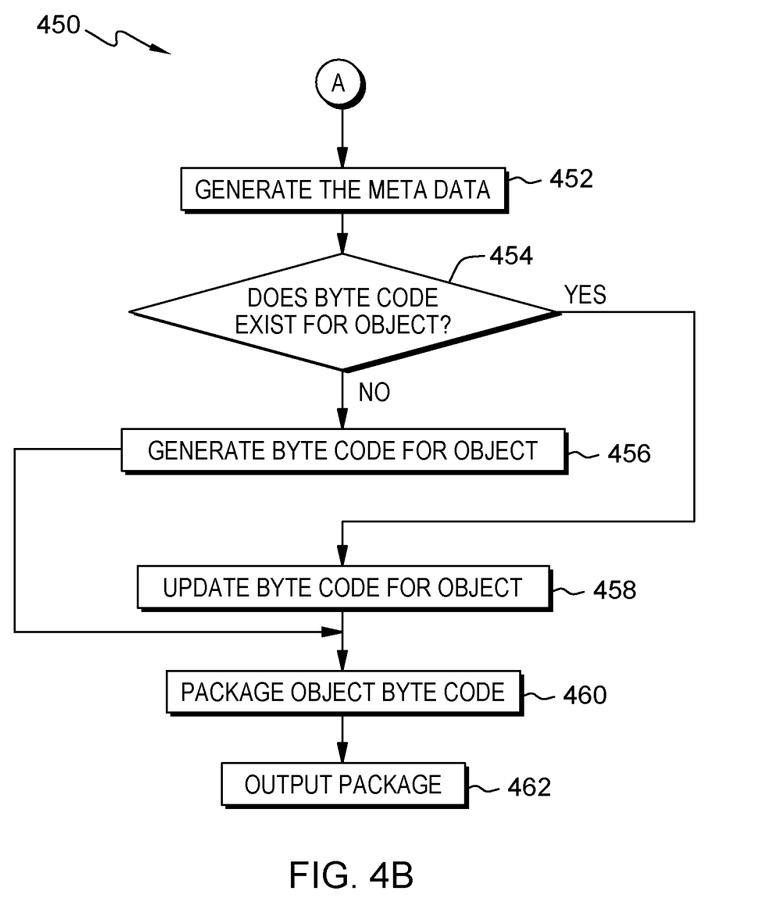

FIGS. 4A and 4B are flowcharts of a method 400, 450 depicting operational steps to create an application prototype from ASCII text-based requirements based on the use of an ASCII dictionary. Looking to step 402, ASCII parser component 302 parses ASCII text-based requirements, for example as a flat file, into a collection of sentences. Next, at step 404, ASCII parser component 302 parses the sentences generated by step 402 into a collection of words for the sentences. Continuing at step 406, ASCII Identity Component 304 compares the words from the collection of words to the ASCII Dictionary Component 306 to identify if a word is a noun or a verb.

Next, at step 408, if the word is a verb then the method 400, 450 moves on to step 410 wherein the identity of the word, i.e., verb, is set as a responsibility. It should be noted in the embodiment that a responsibility, i.e., a verb, is associated with a noun in the verb's sentence. If the word is not a verb then the method 400, 450 continues to step 412 for a determination if the word is a noun. Continuing at step 412, if the word is a noun then the method 400, 450 continues to step 414 wherein the identity of the word is set as an entity and then proceeds to step 416 discussed subsequently. If the word is not a noun then the method 400, 450 proceeds to step 420 discussed subsequently.

Next at step 416, the method 400, 450 determines, with ASCII Identity Component 304, if the word is found in other sentences, i.e., other collections of words associated with the ASCII text-based requirements. If the word is not found in other sentences then the method 400, 450 proceeds to step 420 discussed subsequently. If the word is found in other sentences then the method 400, 450 proceeds to step 418 wherein the word is identified as a collaboration and the method 400, 450 proceeds to step 420. Continuing at step 420, the method 400, 450 determines if this was the last word of the ASCII text-based requirements. If the word was not the last word then the method returns to step 406 for the next word. If the word is the last word then the method 400, 450 proceeds to step 452.

Next at step 452, the method 400, 450 generates the metadata, with Metadata Generation Component 308, for creating the byte code associated with the entities, the collaborations and the responsibilities. It should be noted that metadata further comprises the entry point for the execution of the application prototype and the type of the application prototype, e.g., web-based or standalone. After generating the metadata the method 400, 450 proceeds to step 454.

At step 454, the method 400, 450 determines if byte code for the object already exists, i.e., is this an update to a previously processed ASCII text-based requirements. It should be noted that the object is the byte code generated for a sentence and the associated relationships with other sentences, if any. If the byte code for the object does not already exist then the method 400, 450 proceeds to step 456 and if the byte code for the object exists then the method 400, 450 proceeds to step 458.

Next, at step 456, the method 400, 450 generates the byte code, using Byte Code Generation Component 310, for the metadata associated with the sentence and the relationships with other sentences. The method 400, 450 then proceeds to step 460, discussed subsequently. Continuing at step 458, the method 400, 450 updates the byte code, using Byte Code Generation Component 310, for the existing objects. It should be noted that the updates to the objects are based on the changes in the metadata between the metadata associated with the existing object and the present metadata. The method 400, 450 then proceeds to step 460. Continuing at step 460, the method 400, 450 packages, using the Byte Code Packaging Component 312, the generated and/or updated object byte code and the byte code encryption component into a distributable package allowing execution of the prototype application and proceeds to step 462 wherein the distributable package is output for execution.

Figure 5:
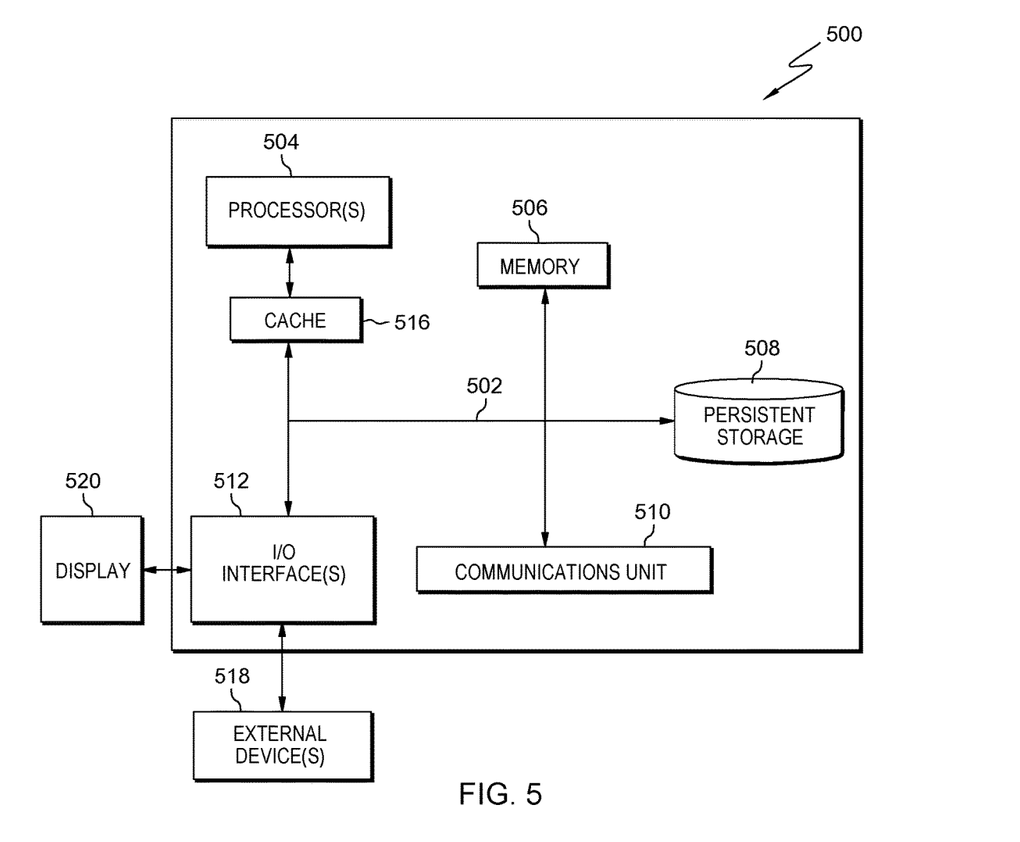
FIG. 5 is a block diagram of components of a prototype generation computer and a user prototype execution computer of an application prototype generation computing environment, in accordance with an embodiment of the present invention.

FIG. 5 depicts computer system 500, an example computer system representative of prototype generation computer 102 and prototype execution computer 104. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for automatically creating an application prototype from text-based requirements, the method comprising:
    creating, by a prototype generation component, a collection of one or more sentences based on parsing a collection of text-based requirements;
    creating, by the prototype generation component, one or more collections of words based on parsing the one or more sentences, respectively;
    identifying, by the prototype generation component, nouns and verbs in the one or more collections of words, wherein the nouns are entities and the verbs are responsibilities associated with the entities;
    determining, by the prototype generation component, if identified entities in one of the one or more collections of words is present in one or more of a remainder of the one or more collections of words;
    responsive to the determining, by the prototype generation component, the identified entities are present in one or more of the remainder of the one or more collections of words, creating one or more collaborations between the entities and a plurality of the one or more collections of words comprising the entities, respectively;
    creating, by the prototype generation component, metadata comprising the entities, the responsibilities and the collaborations for their associated one or more collections of words and an entry point for the execution of an application prototype and the type of application prototype;
    creating by the prototype generation component, bytecode for the metadata associated with the sentence and the relationships with other sentences and packaging the generated bytecode into a distributable packable allowing execution of the application prototype;
    creating, by the prototype generation component, an application prototype based on the metadata and a type for the prototype without involvement of a software developer to create the application prototype wherein the application prototype does not previously exist; and
    transmitting the application prototype to a device, wherein the application prototype is a distributable and executable byte code package that includes an indicator for the entry point of the package where execution of the application prototype begins.

2. The method of claim 1, wherein identifying the nouns and verbs are based on matching a word from the one or more collections of words with a word associated with an ASCII dictionary.

3. The method of claim 2, wherein the text-based requirements and the ASCII dictionary can be in any matching language.

4. The method of claim 1, wherein the type for the prototype comprises web-based and standalone.

5. The method of claim 1, wherein the application prototype is based on extensible markup language (XML).

6. The method of claim 5, further comprising:
    encrypting the XML before executing the application prototype and deleting encrypted XML after the application prototype execution is completed.

7. The method of claim 1, wherein the text-based requirements and the application prototype are baselined together for historical tracking of changes and verifying that changes to the text-based requirements are reflected in the application prototype.

8. A computer program product for automatically creating an application prototype from text-based requirements, the computer program product comprising:
    one or more non-transitory computer readable storage media and program instructions stored on the one or more non-transitory computer readable storage media, the program instructions comprising:
    program instructions to create, by a prototype generation component, a collection of one or more sentences based on parsing a collection of text-based requirements;
    program instructions to create, by the prototype generation component, one or more collections of words based on parsing the one or more sentences, respectively;
    program instructions to identify, by the prototype generation component, nouns and verbs in the one or more collections of words, wherein the nouns are entities and the verbs are responsibilities associated with the entities;
    program instructions to determine, by the prototype generation component, if identified entities in one of the one or more collections of words is present in one or more of a remainder of the one or more collections of words;
responsive to the program instructions to determine, by the prototype generation component, the identified entities are present in one or more of the remainder of the one or more collections of words, program instructions to create one or more collaborations between the entities and a plurality of the one or more collections of words comprising the entities, respectively;
program instructions to create, by the prototype generation component, metadata comprising the entities, the responsibilities and the collaborations for their associated one or more collections of words; and
program instructions to create by the prototype generation component, bytecode for the metadata associated with the sentence and the relationships with other sentences and packaging the generated bytecode into a distributable packable allowing execution of the application prototype;
program instructions to create, by the prototype generation component, an application prototype based on the metadata and a type for the prototype without involvement of a software developer to create the application prototype and wherein the application prototype does not previously exist; and
program instructions to transmit, by the prototype generation component, the application prototype to a device, wherein the application prototype is a distributable and executable byte code package that includes an indicator for the entry point of the package where execution of the application prototype begins.

9. The computer program product of claim 8, wherein identifying the nouns and verbs are based on matching a word from the one or more collections of words with a word associated with an ASCII dictionary.

10. The computer program product of claim 9, wherein the text-based requirements and the ASCII dictionary can be in any matching language.

11. The computer program product of claim 8, wherein the type for the prototype comprises web-based and standalone.

12. The computer program product of claim 8, wherein the application prototype is based on extensible markup language (XML).

13. The computer program product of claim 12, further comprising:
program instructions to encrypt the XML before executing the application prototype and program instructions to delete encrypted XML after the application prototype execution is completed.

14. The computer program product of claim 8, wherein the text-based requirements and the application prototype are baselined together for historical tracking of changes and verifying that changes to the text-based requirements are reflected in the application prototype.

15. A computer system for automatically creating an application prototype from text-based requirements, the computer system comprising:
one or more computer processors;
one or more non-transitory computer readable storage media;
program instructions stored on the one or more non-transitory computer readable storage media for execution by at least one of the one or more computer processors, the program instructions comprising:
program instructions to create, by a prototype generation component, a collection of one or more sentences based on parsing a collection of text-based requirements;
program instructions to create, by the prototype generation component, one or more collections of words based on parsing the one or more sentences, respectively;
program instructions to identify, by the prototype generation component, nouns and verbs in the one or more collections of words, wherein the nouns are entities and the verbs are responsibilities associated with the entities;
program instructions to determine, by the prototype generation component, if identified entities in one of the one or more collections of words is present in one or more of a remainder of the one or more collections of words;
responsive to the program instructions to determine, by the prototype generation component, the identified entities are present in one or more of the remainder of the one or more collections of words, program instructions to create one or more collaborations between the entities and a plurality of the one or more collections of words comprising the entities, respectively;
program instructions to create, by the prototype generation component, metadata comprising the entities, the responsibilities and the collaborations for their associated one or more collections of words; and
program instructions to create, by the prototype generation component, bytecode for the metadata associated with the sentence and the relationships with other sentences and packaging the generated bytecode into a distributable packable allowing execution of the application prototype;
program instructions to create, by the prototype generation component, an application prototype based on the metadata and a type for the prototype without involvement of a software developer to create the application prototype and wherein the application prototype does not previously exist; and
program instructions to transmit, by the prototype generation component, the application prototype to a device, wherein the application prototype is a distributable and executable byte code package that includes an indicator for the entry point of the package where execution of the application prototype begins.

16. The computer system of claim 15, wherein identifying the nouns and verbs are based on matching a word from the one or more collections of words with a word associated with an ASCII dictionary.

17. The computer system of claim 16, wherein the text-based requirements and the ASCII dictionary can be in any matching language.

18. The computer system of claim 15, wherein the type for the prototype comprises web-based and standalone.

19. The computer system of claim 15, wherein the application prototype is based on extensible markup language (XML).

20. The computer system of claim 19, further comprising:
program instructions to encrypt the XML before executing the application prototype and program instructions to delete encrypted XML after the application prototype execution is completed.

* * * * *